US011070876B2

(12) United States Patent
Rodgers et al.

(10) Patent No.: US 11,070,876 B2
(45) Date of Patent: Jul. 20, 2021

(54) SECURITY MONITORING WITH ATTACK DETECTION IN AN AUDIO/VIDEO PROCESSING DEVICE

(71) Applicant: Avago Technologies International Sales PTE. Limited, Singapore (SG)

(72) Inventors: Stephane Walter Rodgers, San Diego, CA (US); Xuemin Chen, Rancho Santa Fe, CA (US); Rui Pimenta, Almondsbury (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 122 days.

(21) Appl. No.: 16/372,298

(22) Filed: Apr. 1, 2019

(65) Prior Publication Data
US 2020/0314491 A1 Oct. 1, 2020

(51) Int. Cl.
*G06F 21/00* (2013.01)
*H04N 21/442* (2011.01)
*H04N 21/44* (2011.01)
*H04L 12/24* (2006.01)
*H04L 29/06* (2006.01)

(52) U.S. Cl.
CPC ....... *H04N 21/44236* (2013.01); *H04L 41/14* (2013.01); *H04L 63/1475* (2013.01); *H04N 21/44008* (2013.01); *H04N 21/44213* (2013.01)

(58) Field of Classification Search
CPC ......... G06F 2211/1059; G06F 11/1044; G06F 16/2365; G06F 21/64; G06F 11/1076; G06F 16/1844; H04N 21/44236; H04N 21/44008; H04N 21/44213; H04L 41/14; H04L 63/1475
See application file for complete search history.

(56) References Cited

U.S. PATENT DOCUMENTS

2017/0076116 A1* 3/2017 Chen .................. G06N 20/00

* cited by examiner

*Primary Examiner* — Ghazal B Shehni
(74) *Attorney, Agent, or Firm* — Morgan, Lewis & Bockius LLP (57) ABSTRACT

A security-monitoring system includes a data-collection module, a security-monitoring module and an attack-detection module. The data-collection module can collect data associated with a data stream. The security-monitoring module monitors a number of activities within a device. The attack-detection module can detect one or more attacks on the device based on the monitored plurality of activities by using one or more trusted processors. The collected data includes one or more security parameters associated with the data stream. The attack-detection module identifies the attacks based on the security parameters and data from the one or more trusted processors.

20 Claims, 8 Drawing Sheets

SECURITY MONITORING WITH ATTACK DETECTION IN AN AUDIO/VIDEO PROCESSING DEVICE

TECHNICAL FIELD

The present description relates generally to integrated circuits and, more particularly, to security monitoring with attack detection in an audio and/or video processing device.

BACKGROUND

Set-top boxes (STBs) and other current broadband audio and/or video processing devices have become highly complex systems designed to provide maximum flexibility and processing performance. These devices are also in transition from fixed function to open framework platforms with a wide range of applications running from multiple parties. While it enhances the user experience, maintaining security in such an environment is an increasing challenge. For example, some broadband devices, e.g., STBs, can be rooted by the user, may allow downloaded applications and are generally designed to allow multiple degrees of freedom in such a way that it is very difficult to ensure security of the content (data) and/or of the device itself. For instance, the prior art techniques of prevention, whereby countermeasures are put in place to stop key or content leakage, may no longer be sufficient because the individual device may not have enough data or processing power to determine whether an action by software is legitimate.

Basic content-piracy schemes in the device, such as downloading illegal content from pirate websites, is likely to be performed with the cooperation of the native device software—either by using a downloaded application or because the system has been placed under direct control of a user. Under these scenarios, the native device software itself may not be a secure option for determining the content-piracy activities that might have happened in the device. As it becomes increasingly difficult to detect specific breaches in today's flexible systems, more sophisticated techniques are needed to stop data piracy. Such techniques should allow all the capabilities that legitimate users expect, while still providing security for the intellectual property of content owners.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

The subject technology is directed to a system-on-chip (SoC) security monitoring to detect suspicious behaviors and identify attacks. The security monitoring and attack detection of the subject technology can effectively stop data piracy and provide security for the intellectual property of content owners while allowing capabilities and functionalities of the SoC that users have come to expect to utilize. The disclosed security-monitoring system can operate in a broadband SoC device and enable collecting, tagging and monitoring of various security parameters associated with a data stream being processed by the device via trusted processors. The data from the monitoring system and the SoC processing modules may be used to detect various attacks such as key sharing, fishing expeditions, illegal video streaming and content sharing, stealing privacy data in the SoC, central processing unit (CPU) bandwidth theft, attacks against the physical medium and other attacks, as described herein.

The monitoring system of the subject technology can collect security parameters associated with the data stream entering a device. These security parameters can be collected from the function units in the device along the one or more data paths of the data stream. The function units may include various data-processing units (e.g., data transport processors, audio and/or video decoders, video postprocessors and graphics processors), security-processing blocks and/or functions (e.g., isolated processors, security processors, CPU with secure processing environment (SPE) and secure memories) and data memories and interfaces (e.g., dynamic random-access memories (DRAMs), nonvolatile memories (NVMs), hard drives, inter-IC sound (I2S) buses, and in-out interfaces (e.g., high-definition media interface (HDMI)).

In some implementations, the collected security parameters from the system may be tagged and stored in memory. In one or more implementations, the collected security parameters are sent to the cloud or the local processing unit(s) for analysis and processing. In some implementations, all monitoring and interface with a cloud-based trusted agent can be performed by the SPE. The monitoring system of the subject technology does not allow any untrusted entity (e.g., untrusted software or untrusted CPU) to interfere with the security monitoring process. The disclosed security system reports unrecognized attacks that may deviate from normal usage and the method by which these parameters can be determined to indicate suspicious behavior. The security system of the subject technology can associate the security parameters related to a data stream with other analytics data in the SoC device for the same data stream to detect attacks.

In some implementations, the disclosed system combines security analytics with nonsecurity analytics to get a wider view of any changes to the set-top box (STB) that could indicate security tampering. The security system can identify attacks, for example, nonpersistent attacks (e.g., after every cold reboot) versus persistent attacks, which are performed once and can work throughout the STB lifecycle. The security system can detect return-oriented programming attacks on monitored CPUs and can apply local countermeasures to defeat the attacks with and without a connection to the headend or cloud server. The security system of the subject technology can detect rollback of firmware that would allow the attacker to exploit older firmware versions that may have vulnerabilities. The disclosed security system can detect unauthorized and/or recognized storage devices (e.g., an unauthorized change of boot flash), and can detect if content licenses have been misused (e.g., cloned or privileged escalated).

Figure 1:
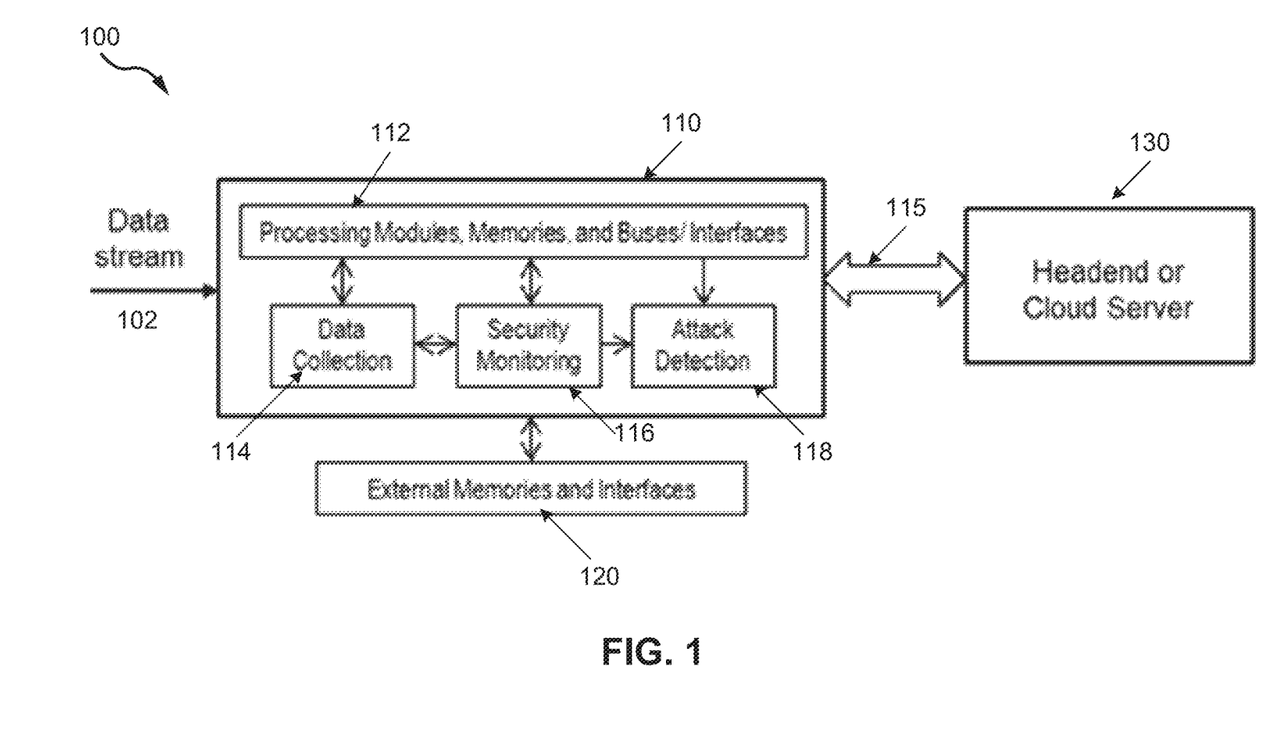
FIG. 1 is a high-level diagram illustrating an example of a system for security monitoring and attack detection, in accordance with one or more aspects of the subject technology.

FIG. 1 is a high-level diagram illustrating an example of a system 100 for security monitoring and attack detection, in accordance with one or more aspects of the subject technology. The system 100 includes a device 110 (e.g., an audio and/or video device such as a STB), an external module 120 including external memories and interfaces, and a remote device 130 (e.g., a secure headend or cloud server). The device 110 receives a data stream 102 (e.g., audio and/or video data stream) for processing (e.g., encoding, decoding, or other processing). In some aspects, the data stream refers to a video and/or audio data stream from a network (e.g., content) or personal video/audio data stream from on-board microphones and cameras. The data related to SoC security analytics can be collected, tagged and assembled into groups to identify data stream characteristics, security configuration, user attempts to interface with security, and a number of other parameters.

The device 110 can communicate (send and receive) data 115 with the remote device 130 (e.g., the headend or the cloud server) via a network (not shown for simplicity). The device 110 can be a broadband SoC including a main unit 112 with processing modules, memories and buses and/or interfaces, a data-collection module 114, a security-monitoring module 116 and an attack-detection module 118. In one or more implementations, the data-collection module 114, the security-monitoring module 116 and the attack-detection module 118 are implemented using hardware and firmware and/or software. In one or more implementations, the data 115 includes security-monitoring related data with security parameters that are sent to the remote device for further analysis (e.g., by using machine learning). In some implementations, the device 110 can perform the analysis of the security parameters locally with assistance from the remote device 130 or independently. In one or more implementations, the security parameters associated with the data stream are collected from one or more function units within the remote device 130 that are along one or more data paths of the data stream. The function units may include data-processing modules with data-transport processors, audio and/or video decoders, video postprocessors, and graphics processors, interfaces and memories.

The data-collection module 114 can instigate and implement the data-collection process by using the SPE or privileged software, and no unprivileged entity may easily interfere with this process. The security-monitoring module 116 looks for unusual behavior, especially when processing data stream 102, in order to identify suspicious activities. The attack-detection module 118 can detect attacks and identify several classes of well-known attacks. It is important that these attack classes are identified early in the process to ascertain any relation between the monitored security analytics and the exploit. In one or more implementations, the attack-detection module 118 may include a secured processor or may use a trusted processor (e.g., of processing module of the main unit 112) to detect and classify attacks. The trusted processors can be local processors or remote processors, which can belong to one or more headends or cloud-based processing units (e.g., 130).

In some aspects, even security analytics that do not directly point to an attack are monitored, as some security breaches may be detected by monitoring some allowed but unusual behaviors. Therefore, the monitored security analytics may fall into one or both of the following categories. The first category of security analytics may directly point to a security breach in which security errors, illegal commands to SPE and so on may fall. The second category of security analytics does not by itself point to a breach, but may indicate unusual behavior(s) as part of a larger set of values. This may include items such as secure memory heap sizes and locations, one-time programmable (OTP) memory configuration, voltage and temperature, and so on.

In all cases, it is crucial to identify what would be the relation between the expected behaviors of these analytics to known attacks. This allows an intelligent analysis of suspicious behaviors. To detect piracy and other hacking attempts in a system where the main application CPU software in Rich Execution Environment (REE) may not be trusted, the subject disclosure describes a number of systems and methods. For example, a security system as described herein can operate independently of the main application CPU in REE. The security system can monitor a large amount of on-chip analytic data related to security. A method of trusting (signing/hardening) ancillary CPUs can be used to gather data and process video, audio and other media data. A method of protecting secure tags from interference by any CPU outside the SPE and a method of associating the security analytics with attack classes are employed by the subject technology and discussed herein.

In some implementations, the data-collection module 114 and the security-monitoring module 116 collect and monitor a list of data items. Examples of the collected and tagged data include the moving picture experts group (MPEG) packet identifications (PIDs) or stream IDs that are flowing through the system, the streams that are being decrypted by security processing processor/module or SPE, the streams that are passing through a video decoder without first being decrypted, the final destination of each stream (e.g., recorder and display), the level of high-bandwidth digital content protection (HDCP) used to output the stream, the source website for the stream (when the stream comes from the web), an OTP configuration of the device 110 (e.g., STB), antirollback counters, box secure locking, secure boot, OTP key IDs, secure DRAM buffer size, location, and type for all configured secure content buffers, secure DRAM buffer size, location, and type for all configured secure code buffers such as a trusted application (TA) or a trusted operating system (OS), the secure TAs that are active in the device 110, the secure TA load and/or unload timestamps, HDMI authentication and/or loss timestamp history, authentication status of all secure codesets in the device 110, including all ancillary CPUs (e.g., in the external module 120), watermarking enable and/or disable status, command activity (types and timestamps) for all secure CPUs in the system, illegal command errors, illegal trusted application requests to the kernel and system voltage variation versus time.

In one or more implementations, the data-collection module 114 gathers and/or tags information including a source (e.g., URLs, a cable or satellite tuner, memory or hard drive playback), a channel number, the time since the last decryption key polarity change, whether the decryption key was written directly (by software) or decrypted from OTP keys, the requester for the generation of the decryption key (i.e., the TA or host that sent the request), the algorithm that is being used to decrypt the stream 102, and the destination of the stream 102 (e.g., export, display or public).

The first purpose of the security-monitoring system 100 is to identify whether user behavior falls into a known class of attacks. The secondary purpose is to look for unusual behavior that may indicate underlying problems. The following disclosure provides examples of the ways well-known attacks can be determined based on collected and monitored security analytics. The disclosure also explains how suspicious behaviors can be inferred even when monitored statistics do not fall into any well-known classes.

When the exploit is not widely known, the hacker/attacker needs a large amount of trial and error attempts before the bug or attack can be made to work. Security monitoring exploits this trial and error by detecting multiple illegal attempts. When the attack is found, it may not be detectable per se. But the work to get to that point will show up in monitored security analytics.

Figure 2:
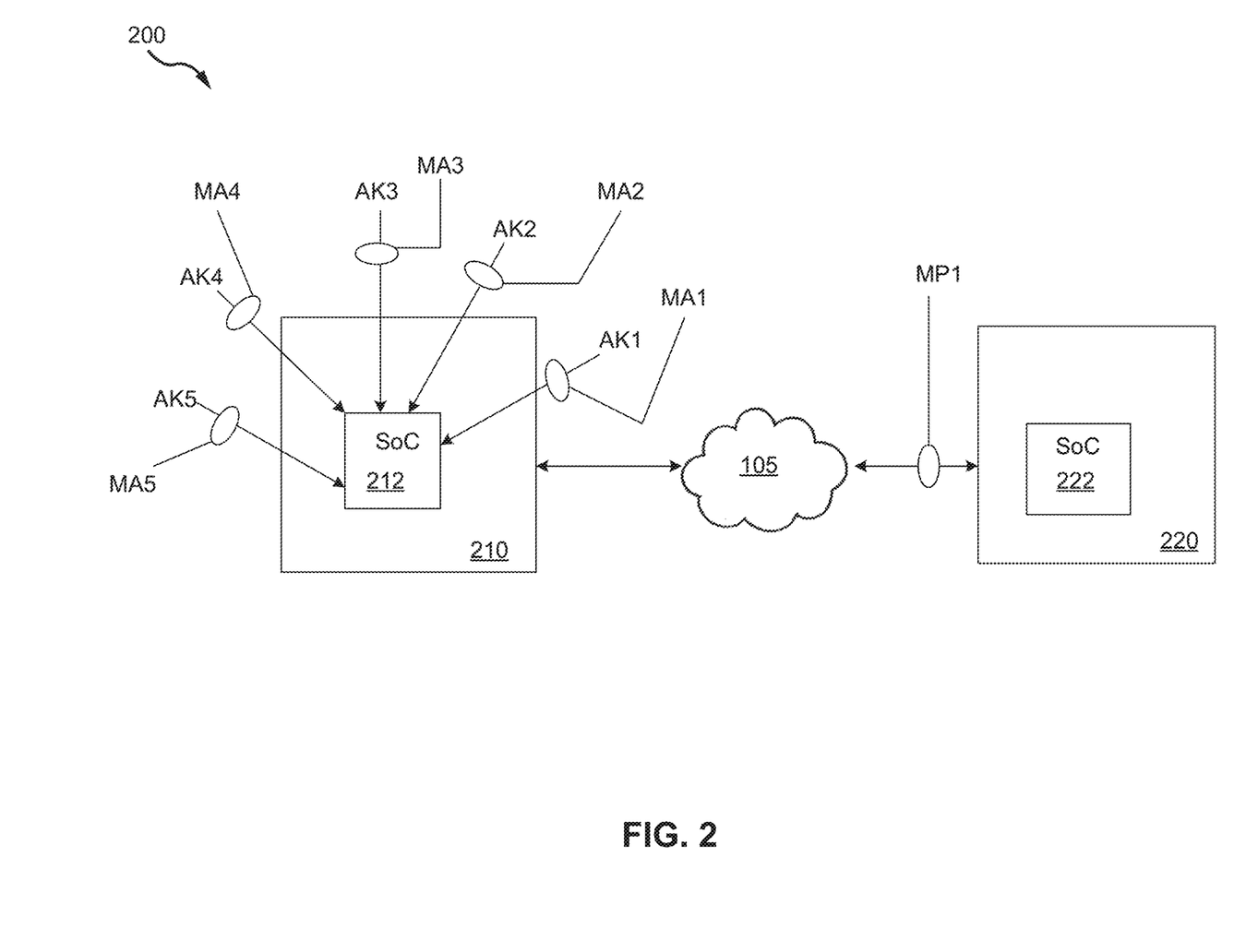
FIG. 2 is a high-level diagram illustrating an example of a security-monitoring scheme in key sharing between a server and a client device, in accordance with one or more aspects of the subject technology.

FIG. 2 is a high-level diagram illustrating an example of a key-sharing scheme 200 in key sharing between a server 210 and a client device 220, in accordance with one or more aspects of the subject technology. The server 210 includes an SoC 212 having suitable circuitry, and is in communication with a number of client devices such as the client device 220 via a network 105. The client device 220 also includes an SoC 222 with suitable circuitry.

In the key-sharing scheme 200, a hacker extracts or calculates control words (CWs) such as keys from one broadband service device (e.g., server 210), for example, the operator who issued a respective STB. The hacker may then send the key to a number of client devices such as the client device 220 or post the key in a network 105 to make it accessible to the client devices (e.g., 220), that may steal the service. Thus, there are two aspects of key sharing: extracting the keys at the server device (e.g., 110) and receiving the keys at the client device (e.g., 220). To extract the keys at the server, a wide variety of attack types may be used. For example, the hacker may use an attack AK1 by exploiting command interface bugs, or use invalid command sequences. This type of attack can be detected by a respective monitoring activity MA1 that includes monitoring an SPE command history. To find a bug or invalid sequence, the hacker has to try many different combinations, and these attempts can be detected as patterns of unusual commands sent to the SoC 212 of the server 210.

The hacker may try an attack AK2 that is a key-generation attack, in which the attacker tries different key commands and looks for allowed routing options that expose a key or part of a key. This type of attack (AK2) can be detected by a respective monitoring activity MA2 that includes monitoring key-generation errors and SPE command history. Examples of the key-generation errors include key commands that result in some type of error such as an attempt to route the key to an invalid location.

A third type of attack used by the attacker is AK3, which is a fuzzing attack in which the hacker uses invalid command parameters to find stack overflows, range errors and so on. This type of attack (AK3) can be detected by a monitoring activity MA3 that involves monitoring SPE command history, SPE command errors and resets. Some invalid parameters can result in reset and others may lead to invalid command errors. These invalid parameters may not show up in the SPE command history as suspicious behavior.

The hacker may use a fourth type of attack (AK4), which is a side-channel attack, for example, through differential analysis, power snooping and so on. The AK4 attack can be detected by a monitoring activity MA4 that monitors SPE command history and specific side-channel errors generated by hardware, and more specifically by detecting many key generation commands in a short period.

A fifth category of attacks (AK5) is a glitch attack, for example, through causing glitches in any of the system voltages, clocks, laser sources or electromagnetic fault injection (EMFI). This type of attack (AK5) can be detected by an SPE monitoring activity MA5 that includes monitoring resets and specific errors. The hardware may have countermeasures to detect glitches, and these may be reported directly to the headend.

At the key-sharing client device side (e.g., 220), the chief parameter to monitor is MP1, which is a key source. Typically, key-sharing clients (e.g., 220) load keys directly into a crypto hardware instead of generating them via a secure key ladder. This is detectable using the tagged stream-processing status data that enables detecting if a stream has been decrypted using, for example, a software-loaded key (note that while SW keys may be disallowed, in some cases this may not be possible).

The security-monitoring system is designed with a number of capabilities, for example, capability of capturing security items that are associated with various possible key-sharing attacks. These security items may include SPE commands with their corresponding time codes, SPE command errors and (device and/or module) resets, key-generation commands with the time codes and key-generation error messages, key-loading methods, specific side-channel errors generated by hardware and specific error messages regarding voltage, clocking, laser, EMFI, and so on.

Other capabilities of the security-monitoring system include securely collecting the captured security parameters and correlating the collected security parameters with data stream-processing analytics. The security parameters may be collected from the function unit within the system, such as data-processing modules including data transport processors, audio and/or video decoders, video postprocessors and graphics processors, interfaces and memories. Examples of data stream-processing analytics include a source of the data stream (e.g., server URL and broadcasting channel), the data stream characteristics such as video format (e.g., 4K high-definition rendering (HDR) with high-efficiency video coding (HEVC) encoding), audio formats (e.g., mixing sound (MS)12 with audio compression (AC)4 encoding) and graphics application formats (e.g., OpenGL ES3.2 application), and the SoC data-path and operating-mode analytics for processing the stream such as SoC configurations, error messages, and so on. For example, a video stream that was received from a QAM channel, went through the data-transport HW block, and then was sent to the HW video decoder or output from an HDMI port. Examples of data stream-processing analytics may further include the SoC processing-module analytics such as the module operating modes, error messages and so on. For example, the HW video decoder may be configured with 10-bit 4K HEVC decoding mode, and the HDMI transmitter may be configured with HDCP 2.3 enabled. Another example of the data stream-processing analytics is the destination of the processed data stream, such as HDMI interface or a Wi-Fi interface.

Further capabilities of the security-monitoring system include securely assembling the all collected information and sending it to the cloud, and classifying the possible attacks by using collected information in the cloud server or in the local SoC device and mitigating the attack risk by disabling certain SoC operations based on the detection results, for example, by overhauling the SPE key generation operation(s).

Figure 3:
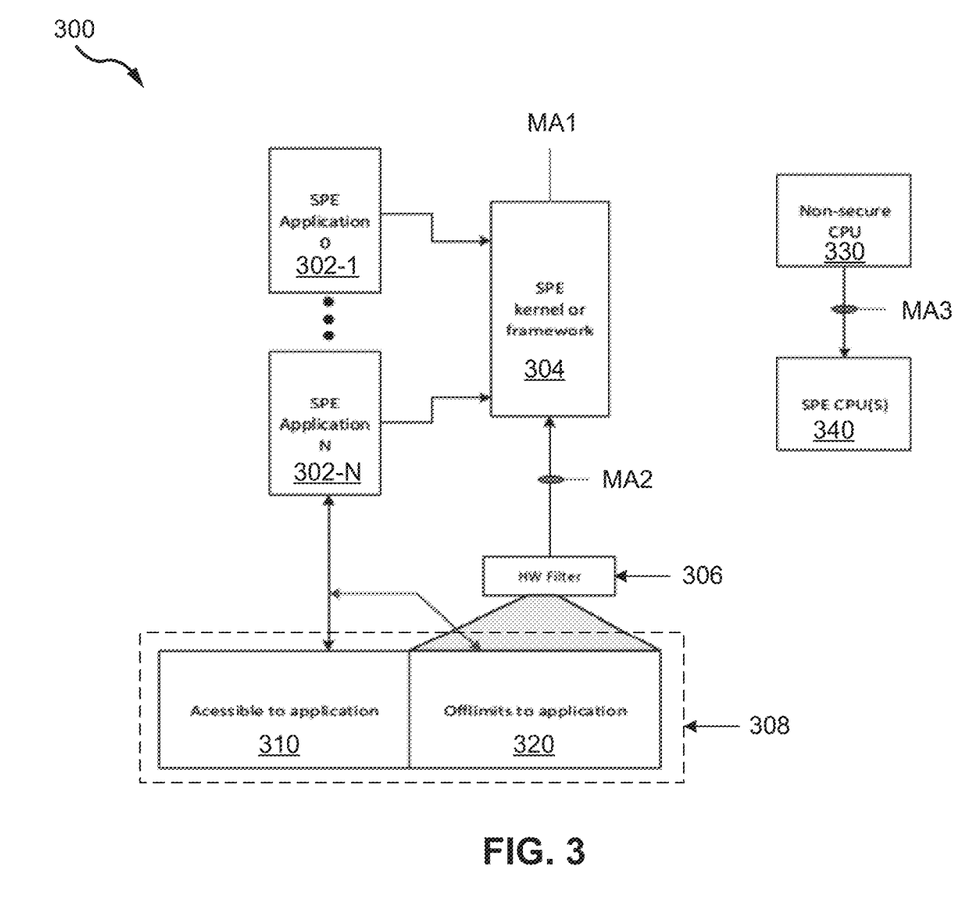
FIG. 3 is a block diagram illustrating an example of a security-monitoring system for a fishing expedition, in accordance with one or more aspects of the subject technology.

FIG. 3 is a block diagram illustrating an example of a security-monitoring system 300 for a fishing expedition, in accordance with one or more aspects of the subject technology. The security-monitoring system 300 includes SPE applications 302 (302-1 through 302-N) and an SPE kernel (or framework) 304, which respectively can access a resource 308 (e.g., a memory such as a RAM). A first portion 310 of the resource 308 is accessible to the SPE applications 302, and a second portion of the resource 308 is off limits to the SPE applications 302 and is only accessible to the SPE kernel 304 through a hardware (HW) filter 306. The security-monitoring system 300 further includes a nonsecure CPU 330 and one or more SPE CPUs 340.

By fishing expeditions, it is meant that rogue SPE applications (e.g., 302) or some nonsecure world applications may try various illegal actions to check what information can be gleaned. These illegal actions include attempted access to a protected memory (e.g., resource 308), TA commands to the SPE kernel 304 requesting unauthorized privileges, and malformed TA commands to the SPE kernel 304 in an attempt to find stack overflows, out-of-range loops, illegal access and so on.

With the security-monitoring system 300 in place, a robust security is implemented with the SPE kernel 304 to have thorough checking for illegal command parameters and requests, and the above illegal actions should be logged as errors. For example, monitoring activities MA1 and MA2 include monitoring illegal application requests and illegal attempted access to the memory (e.g., resource 308), respectively. Further, monitoring activity MA3 involves monitoring illegal command errors and with a time-stamped command history for commands between the nonsecure CPU 330 and the SPE CPU 340. Combined with the time-stamped command history, all of the above information can be sent to a trusted headend (e.g., 130 of FIG. 1) or processed in a local secure engine (e.g., SPE CPU 340), where the information is used to detect hacking attempts. By definition, once an attack is completed, it may no longer be detectable. But the hacker's attempts to find an exploitable attack should be detectable through security monitoring.

Figure 4:
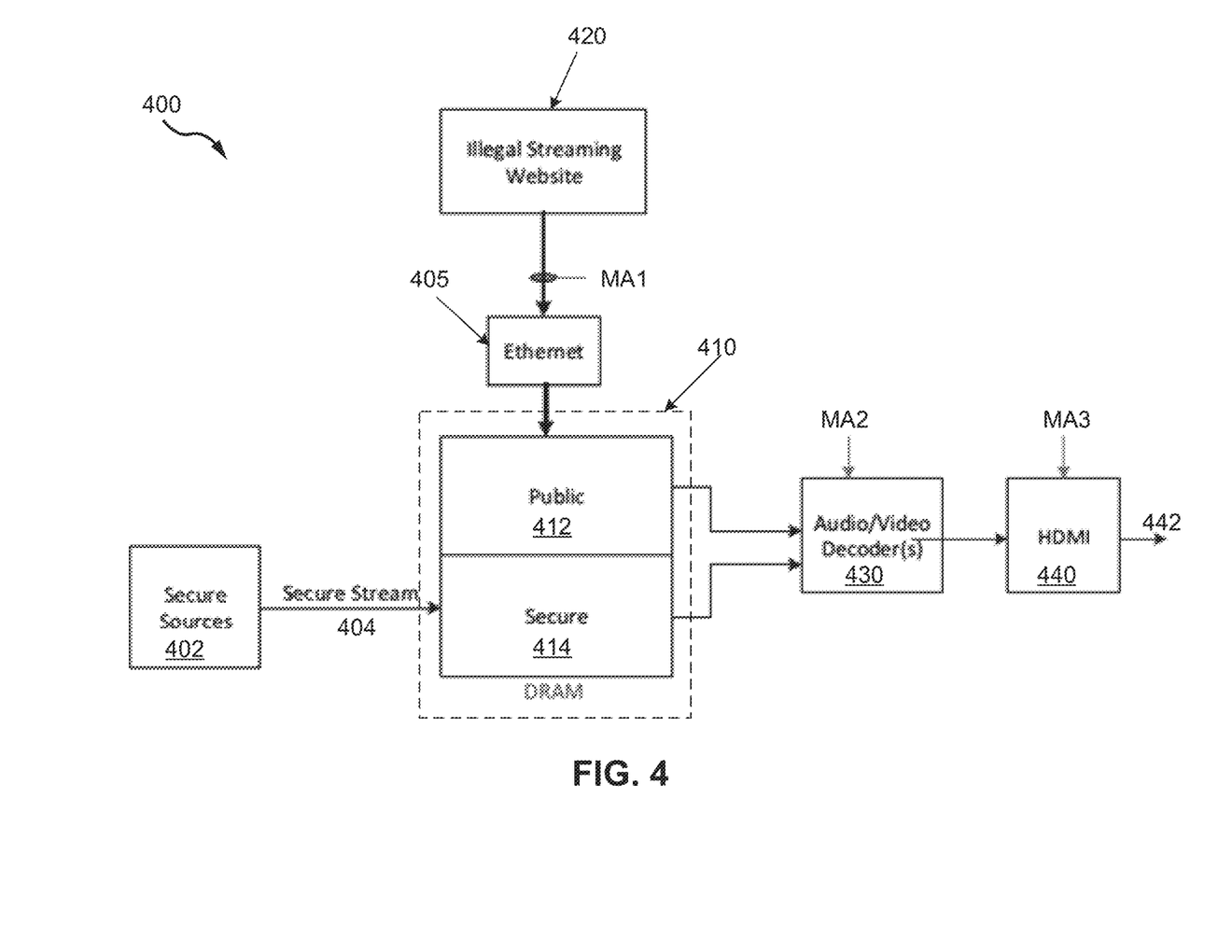
FIG. 4 is a block diagram illustrating an example of a security-monitoring system for a video-piracy scheme, in accordance with one or more aspects of the subject technology.

FIG. 4 is a block diagram illustrating an example of security-monitoring system 400 for a video piracy scheme, in accordance with one or more aspects of the subject technology. The security-monitoring system 400 includes secure sources 402, a DRAM 410, one or more audio and/or video decoders 430 and an HDMI port 440. The DRAM 410 includes a public region 412 and a secure region 414 and may be a component of an SoC of a broadband device (e.g., 210 or 220 of FIG. 2). The video-piracy scheme shown in FIG. 4 is an illegal piracy and/or content-sharing scheme in which a host device is used to access, via a network 405 (e.g., the Internet), one or more websites, for example, an illegal streaming website 420 containing pirated content.

Unlike other categories of exploits, the broadband device itself is not the subject of an attack. But the content is downloaded from websites that have obtained the content illegally. Content sharing is difficult to detect because it resembles a legitimate operation. In a legitimate operation, the device may be used to view free content that is legal, for example YouTube. To separate legal versus illegal usage, content-sharing usage is inferred by monitoring several parameters in combination. With the security-monitoring system 400 in an SoC (e.g., containing the DRAM 410), a long list of parameters and/or data can be collected. The collected parameters include, but are not limited to, accessed website addresses. In many cases, suspected (pirate) websites are known, and simply monitoring website addresses, for example, by the monitoring activity MA1 and comparing them to a blacklist of illegal websites may indicate the possibility that the user is downloading illegal content. However, use of a virtual private network (VPN) may make this difficult. Therefore, a website address is just one of a few monitored parameters to help detect piracy.

Another monitored type of data is source address of the audio and/or video decoders 430, for example, monitored by the monitoring activity MA2, in order to determine if the stream went through decryption. Publicly downloaded, non-digitally right managed (DRMed) video may be fed to the decoders through a global DRAM region (e.g., the public region 412), while decrypted content is fed through a secure region (e.g., 414). The audio and/or video decoders 430 determine the source address, and this can be monitored by the cloud (e.g., via the MA1). The list of monitored data and/or parameters further includes video stream resolution, the audio and/or video decoders 430, which can be monitored by the monitoring activity MA1. Whereas legitimate uses may involve lower-resolution video, illegal video piracy will tend to be at higher resolutions.

Further monitored data includes HDMI counters and traffic monitors of the HDMI port 440 that are monitored by the monitoring activity MA3. For example, the monitoring activity MA3 can detect whether video data 442 is being sent to a TV or another device. Because video piracy resembles legitimate usage, none of these parameters may by themselves indicate that the piracy is happening. But video piracy may be inferred when the entire website is being accessed via VPN (or it matches a known hacker site from a blacklist), the source address of the audio and/or video decoders 430 is in the public region, meaning stream was not decrypted, the video stream is high quality, e.g. 4K HDR or even 8K HDR and the HDMI port 440 indicates that the video stream 442 is going to the TV. If all of these occur, then it may indicate possible video piracy that could be a flag for further investigation. The data from related streams may also be combined into a super set of data to describe the operations of the SoC device. For example, one stream can be tagged with a first label (e.g., cable modem IP input, URLs related to the blacklist, unsubscribed program, video stream, unencrypted, a 4K HDR movie, main ultra-HD display, or no request for HDCP protection), while other stream captured by the same SoC can be tagged with a second label (e.g., microphone speech input from an I2S bus to a voice interface module, speech data, sending to an acoustic processing engine, protected by an advanced encryption standard (AES), sending to a speaker identification engine or output the classified speaker). With the combination of data from these two streams, the operation of the device may be described as "one or more unknown users are watching an unsubscribed and unprotected 4K HDR movie from URLs which are on the blacklist."

In some implementations, by employing machine learning and cloud analysis, the security-monitoring system 400 may detect illegal video streaming and content sharing. In such implementations, the detections may be performed in the SoC device, or in the cloud, or by a combination of two.

Figure 5:
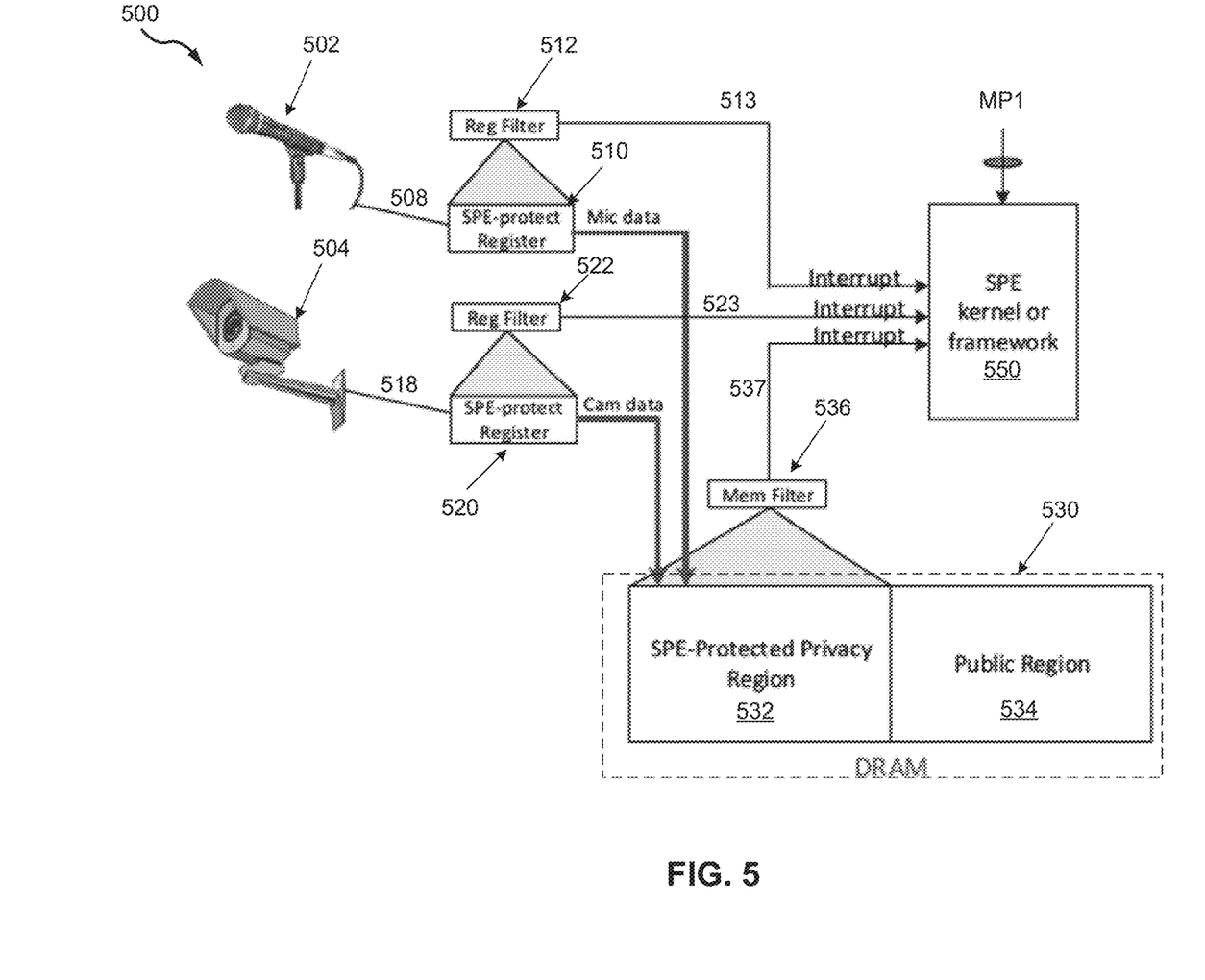
FIG. 5 is a block diagram illustrating an example security monitoring for an audio and/or video recording system, in accordance with one or more aspects of the subject technology.

FIG. 5 is a block diagram illustrating an example of security monitoring for an audio and/or video recording system 500, in accordance with one or more aspects of the subject technology. The audio and/or video recording system 500 (hereinafter, system 500) includes an audio recorder 502 (e.g., microphone), a video recorder 504 (e.g., a camera), an SPE-protected register 510, an SPE-protect register 520, a DRAM 530 and an SPE kernel (or framework) 550. The audio-data stream from the audio recorder 502 is sent to the SPE-protected register 510, and the video data stream from the video recorder 504 is sent to the SPE-protected register 520. The SPE-protected register 510 and the SPE-protected register 520 have access to a SPE-protected privacy region 532 of the DRAM 530. The DRAM 530 further includes a public region 534. Interrupt signals 513, 523 and 537 from the register filters 512 and 522 and a memory filter 536, respectively, are sent to the SPE kernel 550.

Privacy protection is increasingly important nowadays. On a broadband device (e.g., system 500), some captured data such as microphone data 508, camera data 518 and other data such as biometric data, must be kept private. In a hardened, privacy-protected device or system, this private data will be input via, for example, microphones (e.g., 502), cameras (e.g., 504), or other means, and, after passing through chip registers (e.g., 510 and 520), are written to protected areas (e.g., 532) of the DRAM 530. Attacks against this data may involve an application trying to read information from the registers (e.g., 510 and 520), gaining illegal control of the underlying hardware, and/or trying to read the privacy data from the SPE-protected region 532 of the DRAM 530. In the broadband SoC device, the security filters (e.g., 512, 522 and 536) are designed to provide access control for blocking accesses to the unauthorized hardware and memory. While these filters will block accesses, they may also be used by the security-monitoring system to detect when an illegal access is attempted.

If a hacker ever finds an exploit against these filters, it will come after many illegal attempts. These tries are also detectable and monitorable by the security-monitoring system. In the security monitoring, these hardware register filters 512, 522 and 536 may send interrupt signals 513, 523 and 537 to the SPE kernel 550 to indicate when access is attempted. The interrupt signals 513, 523 and 537 can be logged and then sent to a headend or the cloud (e.g., 130 of FIG. 1) for analysis to detect privacy breaches. A monitoring activity MA1 on the SPE kernel 550 can monitor illegal attempted register or memory (e.g., DRAM) access. In some implementations, the system 500 can choose to automatically act to prevent leaking of data (e.g., shut down the device on data misuse detection).

Figure 6:
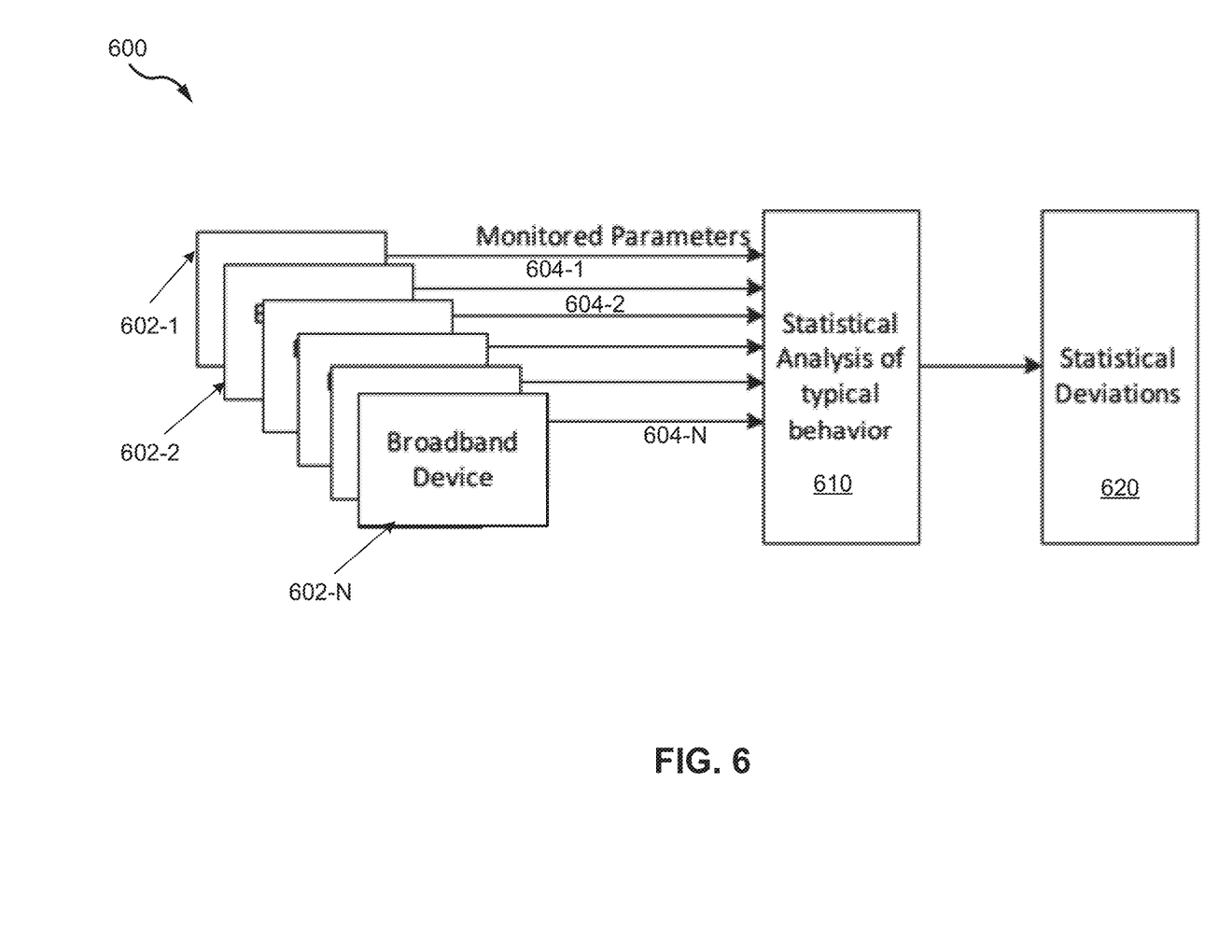
FIG. 6 is a flow diagram illustrating an example of a data security-management scheme, in accordance with one or more aspects of the subject technology.

FIG. 6 is a flow diagram illustrating an example of a data security-management scheme 600, in accordance with one or more aspects of the subject technology. The data security management scheme 600 includes sending monitored data and/or parameters 604 (604-1, 604-2 . . . 604-N) from broadband devices 602 (602-1, 602-2 . . . 602-N) (e.g., STBs) to a statistical-analysis block 610. In one or more implementations, the statistical analysis block 610 may be part of the broadband devices 602 or may be part of a remote device or server (e.g., a headend or a cloud server such as 130 of FIG. 1). The statistical-analysis block 610 can statistically analyze behavior of the collected monitored data and/or parameters 604 and report unusual behaviors. The statistical-analysis block 610, when in a remote server, can advantageously have access to data and parameters from a large number (e.g., thousands) of broadband devices and to more powerful processing resources.

The subject technology, as disclosed above, can monitor and counter other attacks such as attacks against a physical execution medium (e.g., DRAM), illegal CPU usage, return-oriented programming (ROP) attacks, nonauthorized/unrecognized storage devices attacks, illegal firmware rollbacks, local and remote countermeasures, DRAM-like license cloning and other attacks. For example, in attacks against the physical execution medium, an attacker may attempt to insert code into the physical execution device (e.g., DRAM). A system that continually monitors the integrity of the executed code can catch this attempt and report it to a headend server, for instance.

Some classes of attacks are designed to steal CPU bandwidth or power, rather than content. Examples are bitcoin mining and surreptitious distributed applications. These may be indirectly detectable by monitoring parameters such as CPU clock speed, CPU thermal (heat) condition, and/or CPU voltage. Monitoring these items by themselves may not prove that CPU bandwidth is being stolen, since the CPU may be performing intensive and legitimate tasks. Analysis of these parameters would include examining the rest of the system to see if higher CPU activity is warranted by legitimate applications. For example, a system in which only a single stream of video is being decoded, without much else going on, very high CPU thermal condition (e.g., temperature) could be suspicious. It is also suspicious if this high level of activity is prolonged, or occurs at regular intervals.

Referring to persistent versus nonpersistent attacks, depending on the system, some attacks can be applied in a persistent way others require the attacker to repeat the attack every time (e.g., on every power cycle). These attacks can be indirectly detected by monitoring parameters such as a boot flow, the type of commands utilized, the number of active operating system users in the device, and the type of active user privileges. These monitoring items can be used to compare a particular device against a similar population of devices to conclude on any deviance by the headend or cloud server. However, the number of active operating system users in the device and the type of active user privileges can be utilized locally to automatically detect attacks and possibly apply countermeasures.

The ROP attacks allow the attackers to make use of a legitimate code and execute the legitimate code in the attacked device in the order they want. The monitoring system can monitor CPUs (e.g., system access or sequence of commands) to detect if the legitimate code is being executed in a unexpected order. This detection can be performed locally and/or in the headend or cloud server. In case the executing order is not as expected, the monitoring system can act by deploying measures that can prevent or limit the exposure of device data, for example, any personal data or any data that can be sensitive and is to be protected.

Now referring to nonauthorized and/or unrecognized storage devices, a majority of storage devices can be uniquely identifiable, meaning that every device (e.g., an STB) has unique storage devices attached to it. The monitoring system can report all attached devices and identify unauthorized changes. The headend and/or the cloud server can then analyze the data and decide if the client is sourcing and/or outputting data from or to allowed devices.

Regarding illegal firmware rollback, some systems are not able to prevent particular versions of firmware and/or software from being loaded or utilized, for example, allowing the attacker to load older versions of firmware that may contain vulnerabilities. The security system can detect and report to the headend or the cloud server which version of firmware and/or software is in use. The headend or the cloud server can then decide to deploy measures to enforce the use of the correct firmware and/or software versions. For example, the cloud server can stop any video service, remove the device from its network or automatically push a new version and force it to be used.

Now referring to local and remote countermeasures, it is noted that not all systems are able to have a return path to the headend or cloud server to provide monitoring data. There are two main reasons that this happens. First, the system is part of a broadcast-only ecosystem (e.g. satellite) and doesn't have a way to feedback information to the headend/cloud server. Second, the attacker blocks the communication to the headend/cloud server (e.g., configures the router to drop all outgoing monitoring packages). In these cases, the device can have rules to apply measures based on monitored data that doesn't require statistics from the population of devices (e.g., as could be done by the headend or cloud servers). Monitoring a number of situations can be utilized locally to apply countermeasures, for example, lack of return path for the monitoring data, wrong firmware versions, unauthorized storage devices, unauthorized applications, and unauthorized usage of data, such as personal data or any other stream data that doesn't comply with established rules.

Regarding DRM-like license cloning, it is to be noted that in some cases the content stored in the DRAM is protected via licenses that are stored in, for example, flash memory, and that are subject to cloning. Licenses have their own formats and identifiers, which can be unique or global to a product. By obtaining the license values that identify license characteristics, it is possible for the system to determine the legitimacy of the license.

Many attacks may not be instantly recognizable or classifiable. That is the nature of the security. Because of this, it is important to monitor a large number of security variables across many different devices so that statistical deviations may be found. These deviations may not be illegal, but can be red flags for further investigation. The methodology would be to first institute a training session, to determine typical behavior for a large number of devices in the network, using security monitoring analytics and machine learning. Then, this training would be used to establish baseline behavior, and any major deviations by a large number of STBs could be detected. This allows detection to occur via automatic methods, for example, without human involvement. In addition, the system may include in the examination other types of analytics not traditionally related to security. For example, the network bandwidth analytics may be combined with security statistics to determine whether large amounts of video are being downloaded. Other combinations are also possible.

Figure 7:
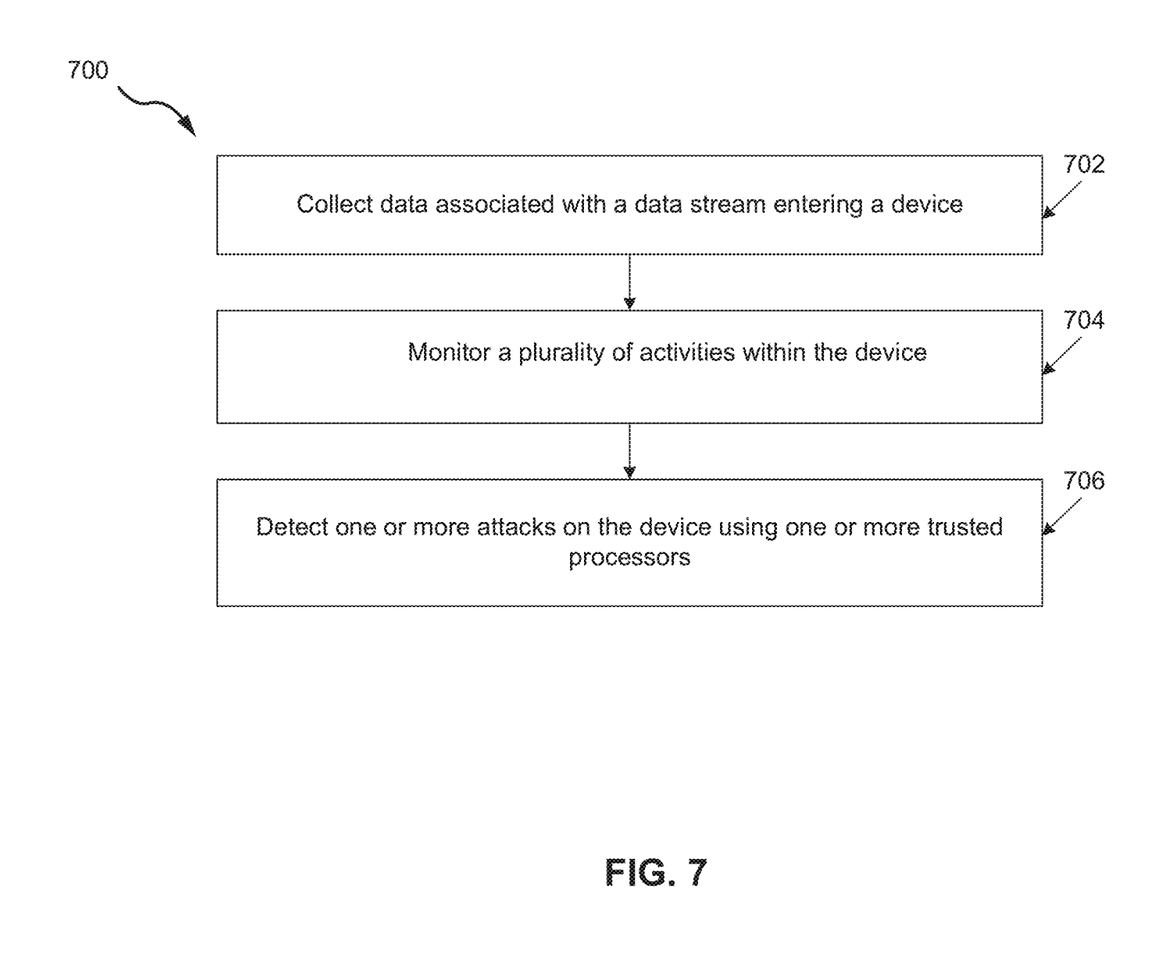
FIG. 7 is a flow diagram illustrating an example of a method of security monitoring with attack detection, in accordance with one or more aspects of the subject technology.

FIG. 7 is a flow diagram illustrating an example of a method 700 of security monitoring with attack detection, in accordance with one or more aspects of the subject technology. The method 700 includes collecting data (e.g., by 114 of FIG. 1) associated with a data stream (e.g., 102 of FIG. 1) entering a device (e.g., 110 of FIG. 1 or 210 of FIG. 2) (702). The method 700 further includes monitoring (e.g., by 116 of FIG. 1) a plurality of activities within the device (704). One or more attacks (e.g., attacks AK1 through AK5 of FIG. 2) on the device can be detected (e.g., by 118 of FIG. 1) using one or more trusted processors (e.g., 340 of FIG. 3) (706). The collected data includes one or more security parameters associated with the data stream, and detecting the attacks is based on the security parameters and data from the trusted processors.

Figure 8:
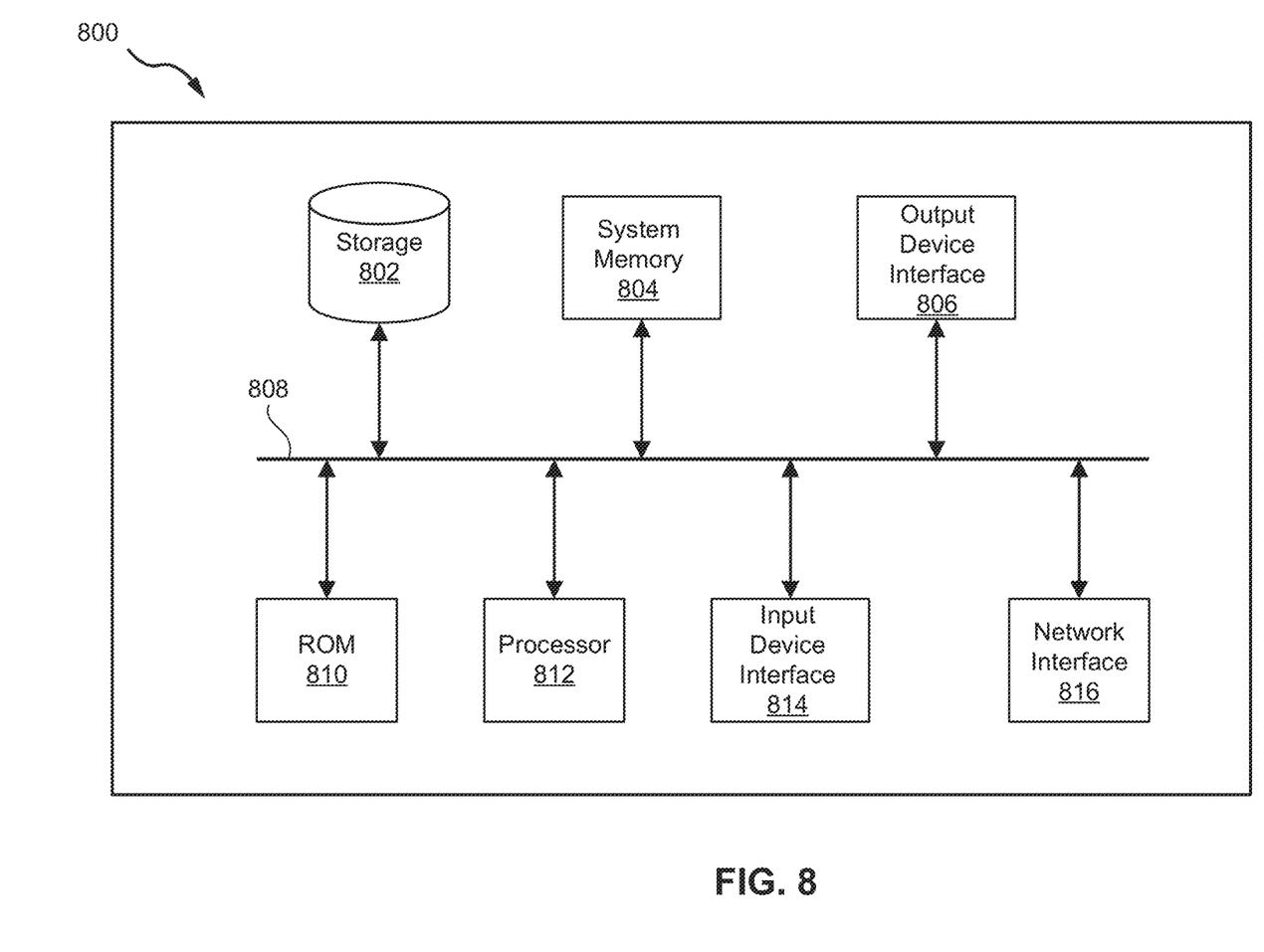
FIG. 8 is a block diagram illustrating a computer system, within which one or more aspects of the subject technology can be implemented.

FIG. 8 conceptually illustrates electronic system 800 with which any implementations of the subject technology are achieved. Electronic system 800, for example, can be a desktop computer, a laptop computer, a tablet computer, a server, a switch, a router, a base station, a receiver, an STB, a phone, a personal digital assistant (PDA) or generally any electronic device such as a broadband device or an audio and/or video device that can be monitored and protected by the security monitoring and attack detection of the subject technology. Such an electronic system includes various types of computer-readable media and interfaces for various other types of computer-readable media. Electronic system 800 includes bus 808, processing unit (s) 812, system memory 804, read-only memory (ROM) 810, permanent storage device 802, input device interface 814, output device interface 806, and network interface 816, or subsets and variations thereof.

Bus 808 collectively represents all system, peripheral, and chipset buses that communicatively connect the numerous internal devices of electronic system 800. In one or more implementations, bus 808 communicatively connects processing unit(s) 812 with ROM 810, system memory 804, and permanent storage device 802. From these various memory units, processing unit(s) 812 retrieve(s) instructions to execute and data to process in order to execute the processes of the subject disclosure. The processing unit(s) 812 can be a single processor or a multicore processor in different implementations.

ROM 810 stores static data and instructions that are needed by processing unit(s) 812 and other modules of the electronic system. Permanent storage device 802, on the other hand, is a read-and-write memory device. This device is a nonvolatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk, or a flash drive, and its corresponding disk drive) as permanent storage device 802. Like permanent storage device 802, system memory 804 is a read-and-write memory device. However, unlike storage device 802, system memory 804 is a volatile read-and-write memory device, such as RAM. System memory 804 stores any of the instructions and data that processing unit(s) 812 need (s) at runtime. In one or more implementations, the processes of the subject disclosure are stored in system memory 804, permanent storage device 802, and/or ROM 810. From these various memory units, processing unit(s) 812 retrieve(s) instructions to execute and data to process in order to execute the processes of one or more implementations.

Bus 808 also connects to input and output device interfaces 814 and 806. Input device interface 814 enables a user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, bus 808 also couples electronic system 800 to a network (not shown) through network interface 816. In this manner, the computer can be a part of a network of computers (such as a local area network ("LAN"), a wide area network ("WAN"), or an Intranet, or a network of networks, such as the Internet). Any or all components of electronic system 800 can be used in conjunction with the subject disclosure.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing units (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards), magnetic and/or solid state hard drives, ultradensity optical discs, any other optical or magnetic media and floppy disks. In one or more implementations, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In one or more implementations, the computer-readable media is nontransitory computer-readable media, computer-readable storage media, or non-transitory computer-readable storage media.

In one or more implementations, a computer program product (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

While the above discussion primarily refers to microprocessor or multicore processors that execute software, one or more implementations are performed by one or more integrated circuits, such as application specific integrated circuits or field programmable gate arrays. In one or more implementations, such integrated circuits execute instructions that are stored on the circuits themselves.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A word such as "aspect" does not imply that such aspect is essential to the subject technology or that such aspect applies to all configurations of the subject technology. A disclosure relating to an aspect may apply to all configurations, or one or more configurations. A word such as "aspect" may refer to one or more aspects and vice versa. A word such as "configuration" does not imply that such configuration is essential to the subject technology or that such configuration applies to all configurations of the subject technology. A disclosure relating to a configuration may apply to all configurations, or one or more configurations. A word such as "configuration" may refer to one or more configurations and vice versa.

The word "example" is used herein to mean "serving as an example or illustration." Any aspect or design described herein as an "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A security-monitoring system for a device, the system comprising:
   a data-collection module configured to collect one or more security parameters associated with a data stream input to the device;
   a security-monitoring module configured to monitor a plurality of activities associated with the data stream within the device; and
   an attack-detection module configured to detect one or more attacks on the device based on the one or more security parameters and the monitored plurality of activities, wherein the attack-detection module detect attacks by using one or more trusted processors.

2. The system of claim 1, wherein the device comprises a broadband system-on-chip (SoC) and the security-monitoring system is implemented on the broadband SoC.

3. The system of claim 1, wherein the attack-detection module is configured to detect one or more attack types including key-sharing attacks, fishing expeditions, illegal video streaming and content sharing, stealing privacy data, central processing unit (CPU) bandwidth theft, attacks against a physical medium, glitch attacks, side-channel attacks, malformed command attacks, illegal requested right attacks, attacks against data privacy, command-based attacks by Rich Execution Environment (REE) against a secure processing environment (SPE) and attacks from rogue SPE-based trusted applications (TAs) against a kernel.

4. The system of claim 1, wherein the one or more security parameters associated with the data stream are collected from one or more function units within the device that are along one or more data paths of the data stream, and wherein the one or more function units comprise data-processing modules including data transport processors, audio and/or video decoders, video postprocessors and graphics processors.

5. The system of claim 4, wherein the one or more function units further comprise security processing blocks and/or functions and data memories and interfaces, wherein the security processing blocks and/or functions include isolated processors, security processors, CPUs with SPE and secure memories, and wherein the data memories and interfaces include dynamic random-access memories (DRAMs), nonvolatile memories (NVMs), hard drives, inter-IC sound (I2S) buses and high-definition media interface (HDMI) ports.

6. The system of claim 1, wherein the one or more trusted processors are configured to tag data values of the one or more security parameters associated with the data stream along one or more processing paths in device.

7. The system of claim 6, wherein the one or more trusted processors are further configured to identify attack types, wherein for each attack type a number of respective security parameters are monitored.

8. The system of claim 7, wherein the respective security parameters include accessed website addresses, source addresses of video and/or audio decoders, HDMI counters and traffic monitors, video stream resolutions, boot flows, types of commands utilized a count of active operating system users of the device and types of active user privileges, wherein the types of commands utilized comprise commands for security key loading.

9. The system of claim 1, wherein the one or more trusted processors are at least one of local processors implemented within a secure processing environment (SPE) or remote processors, wherein the system interfaces with the remote processors via the SPE.

10. The system of claim 1, wherein the security-monitoring module is configured to monitor the plurality of activities associated with the data stream within the device using a secure processing environment (SPE), wherein the SPE is configured to block an untrusted processing unit in the device from interfacing with the security monitoring module, and wherein interfaces with cloud-based trusted agents are performed by the SPE.

11. A method of security monitoring a device, the method comprising:
    collecting one or more security parameters associated with a data stream input to the device;
    monitoring a plurality of activities associated with the data stream within the device; and
    detecting one or more attacks on the device based on the one or more security parameters and the monitored plurality of activities, wherein the one or more attacks are detected by using one or more trusted processors.

12. The method of claim 11, further comprising reporting unrecognized attacks that deviate from normal usage, and determining a suspicious behavior based at least on the one or more security parameters.

13. The method of claim 11, wherein the device comprises a device, and wherein the method further comprises associating the one or more security parameters with analytics data in the SoC device related to the data stream to detect attacks.

14. The method of claim 11, further comprising combining security analytics with nonsecurity analytics to obtain a wide view of any changes to the device that could indicate security tampering.

15. The method of claim 11, further comprising distinguishing nonpersistent attacks from persistent attacks, wherein the nonpersistent attacks occur after a cold reboot, and the persistent attacks occur once and can work throughout a lifecycle of the device.

16. The method of claim 11, further comprising detecting:
    return-oriented programming attacks on monitored CPUs,
    rollback of firmware attacks that allow an attacker to exploit older firmware versions including vulnerabilities,
    unauthorized changes in a storage device, and
    misuse of content licenses including cloned and privileged escalated licenses.

17. The method of claim 11, further comprising applying local countermeasures to defeat detected attacks with and without a connection to a headend or a cloud server.

18. A system for security-monitoring and attack detection, the system comprising:
a first system-on-chip (SoC); and
a second SoC coupled to the first SoC via a network, wherein the first SoC is configured to:
collect one or more security parameters associated with a data stream input to the first SoC;
monitor a plurality of activities associated with the data stream within the first SoC and associated with the second SoC; and
detect one or more attacks on the first SoC based on the one or more security parameters and the monitored plurality of activities, wherein the one or more attacks are detected by using one or more trusted processors.

19. The system of claim 18, wherein the one or more trusted processors are configured to associate the one or more security parameters with analytics data in the first SoC related to the data stream to detect attacks.

20. The system of claim 18, wherein the first SoC is configured to use SPE-monitoring activities to detect various attacks, and wherein the first SoC is further configured to use local countermeasures to defeat detected attacks with and without a connection to a headend or a cloud server.

* * * * *

UNITED STATES PATENT AND TRADEMARK OFFICE
CERTIFICATE OF CORRECTION

PATENT NO. : 11,070,876 B2  
APPLICATION NO. : 16/372298  
DATED : July 20, 2021  
INVENTOR(S) : Rodgers et al.

Page 1 of 1

It is certified that error appears in the above-identified patent and that said Letters Patent is hereby corrected as shown below:

In the Claims

Column 16, Line 44 (Claim 13): Add --broadband SoC--, before "device".

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*